US006826271B1

(12) United States Patent
Kanabar et al.

(10) Patent No.: US 6,826,271 B1
(45) Date of Patent: Nov. 30, 2004

(54) ENHANCED CALLER IDENTIFICATION

(75) Inventors: Paresh Chhabildas Kanabar, Naperville, IL (US); Phillip Michael Sands, Champaign, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/568,068

(22) Filed: May 10, 2000

(51) Int. Cl.[7] .............................................. H04M 3/42
(52) U.S. Cl. ............................ 379/212.01; 379/211.01; 379/214.01; 379/88.21; 379/142.01
(58) Field of Search ........................ 379/88.21, 93.23, 379/142.01, 207.15, 212.01, 221.08, 230, 142.06, 211.01, 211.02, 213.01, 214.01

(56) References Cited

U.S. PATENT DOCUMENTS

| | | | | |
|---|---|---|---|---|
| 5,274,700 A | * | 12/1993 | Gechter et al. | 379/211.01 |
| 5,696,815 A | * | 12/1997 | Smyk | 379/142.16 |
| 5,740,240 A | * | 4/1998 | Jolissaint | 379/265.02 |
| 5,751,791 A | * | 5/1998 | Chen et al. | 379/88.13 |
| 5,796,812 A | * | 8/1998 | Hanlon et al. | 379/212.01 |
| 5,903,636 A | * | 5/1999 | Malik | 379/142.01 |
| 5,915,010 A | | 6/1999 | McCalmont | 379/212 |
| 5,915,012 A | * | 6/1999 | Miloslavsky | 379/265.02 |
| 5,982,870 A | * | 11/1999 | Pershan et al. | 379/221.08 |
| 5,995,826 A | | 11/1999 | Cox et al. | 455/414 |
| 6,038,293 A | * | 3/2000 | McNerney et al. | 379/88.19 |
| 6,178,232 B1 | * | 1/2001 | Latter et al. | 379/88.21 |
| 6,233,333 B1 | * | 5/2001 | Dezonmo | 379/266.1 |
| 6,292,549 B1 | * | 9/2001 | Lung et al. | 379/142.01 |
| 6,449,351 B1 | * | 9/2002 | Moss et al. | 379/142.09 |

FOREIGN PATENT DOCUMENTS

| | | | | |
|---|---|---|---|---|
| EP | 0 913 982 A2 | * | 6/1999 | H04M/3/50 |
| EP | 954153 | | 11/1999 | H04Q/3/72 |
| WO | WO9957917 | | 11/1999 | H04Q/3/00 |

* cited by examiner

Primary Examiner—Bing Q. Bui

(57) ABSTRACT

Apparatus and a method for providing accurate caller identification to a called party. If a call is transferred to a called party, the called party receives the identification of the caller, not of the intermediate station. Advantageously, the caller is identified to the called party, even if the call is transferred.

8 Claims, 4 Drawing Sheets

ENHANCED CALLER IDENTIFICATION

TECHNICAL FIELD

This invention relates to automatic calling line identification in telecommunications systems.

PROBLEM

Calling line identification is a very popular service. It allows the user of the service to identify the caller and to either be prepared to talk to that caller, or to ignore the call.

In recent years, calling line identification has been further enhanced by providing the name of the owner of the telephone line or mobile station that is making a call. Thus, the called party need not be able to recognize the caller's telephone number, but can simply see the caller's name.

A problem with presently available calling line identification is that if the call has been transferred, the identification that the called party receives is the identification of the line and name of the party from which the call was transferred.

SOLUTION

Applicants have further analyzed this problem and have recognized that the ideal solution is to provide the original caller's identification to a called party, i.e., to any station that is alerted for the call.

Applicants have solved the above problem and have made a contribution over the teachings of the prior art in accordance with their invention, wherein if a call is transferred from another line, the called party sees a calling line identification display or hears a calling line identification announcement that corresponds to the original caller's identification, not to the identification of the line from which a call was transferred. For calls that are transferred, the original calling line identification, possibly enhanced by the name associated with the caller's telephone number, is retained by the transferring switch and is inserted into the calling line identification field of the signaling message between the transferring switch and the terminating switch. The terminating switch will then send or announce to the called party the telephone number and/or name of the caller as received in the signaling message, not the name and/or telephone number of the transferring party.

In accordance with one aspect of Applicants' invention, for customers having a transfer feature or three-way calling feature, when a call to such customer is made, the switching system serving that customer retains the caller's identification. Subsequently, if the called party transfers the call to a third party, the signaling message (for inter-office calls) or the calling line identification message, uses the retained information, not information associated with the party which originally answered the call. The basic principle, that on all transferred calls, the calling lines identification information is retained in the calling line identification field of the signaling message, makes implementation of this feature a straightforward process.

BRIEF DESCRIPTION OF THE DRAWING(S)

DETAILED DESCRIPTION

Figure 1:
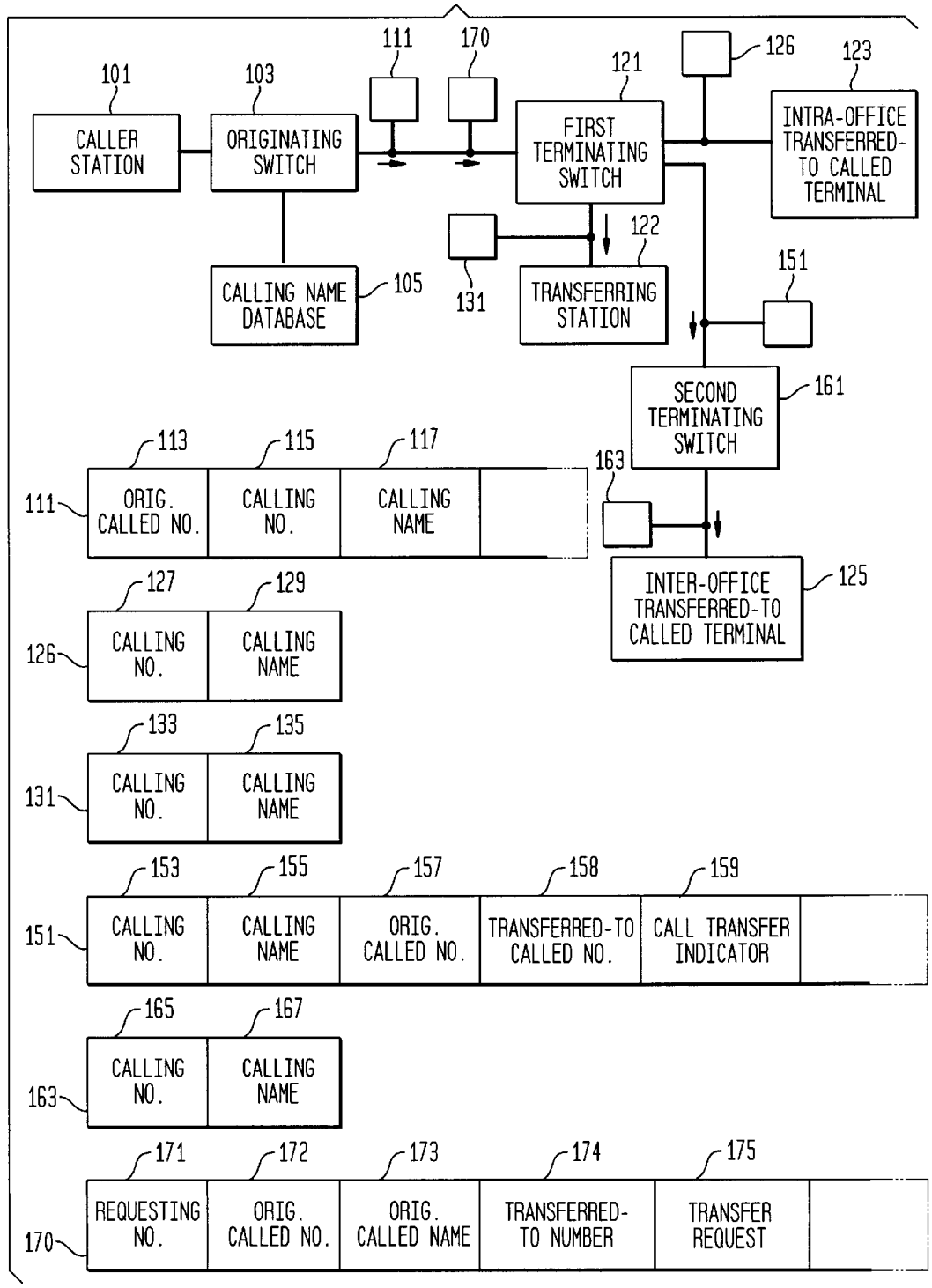
FIG. 1 is a block diagram illustrating Applicants' invention.

FIG. 1 is a block diagram illustrating Applicants' invention. A caller station 101 connected to an originating switch 103, originates a call. The originating switch optionally consults a database 105 to determine the name associated with the caller's telephone number. For an inter-office call, a common channel signaling message 111 is sent to the switch specified by the original called number, i.e., the number dialed or specified, (e.g., via speed calling), by the caller station. (All messages shown herein include only those fields which pertain to the invention; many other fields are required for controlling all other actions required for establishing connections in a network.) The message 111 transmitted to the first terminating switch 121 includes the original called number 113, the calling number 115, and the calling name 117. The first terminating switch 121 sends message 131 to the transferring line 122. Message 131 includes the original calling number 133, and calling name 135.

First terminating switch 121 retains the calling number 115 and the calling name 117 of the initial address message 111, if the original called number has a call transfer feature.

If a call is to be transferred, it may be transferred to an intra-office called terminal 123, or an inter-office called terminal 125. If the call is being transferred to terminal 123, then message 126, including calling number 127 and calling name 129, is sent along with the alerting signal from terminating switch 121 to called terminal 123. If the call is being transferred to an inter-office called terminal 125, then message 151 is prepared in first terminating switch 121. The inter-office call set-up message 151 includes the calling number 153, the calling name 155, original called number 157 (needed for call set-up purposes), and the transferred-to called number 158, (also needed for call set-up purposes). A call transfer indicator 159 is also provided in the message. The second terminating switch 161 receives this message and sets up a connection to called terminal 125. It sends to that terminal, a calling number identification message 163, including the intended calling number 165, and the intended calling name 167. Optionally, the message can include a transfer indicator for display at the called terminal.

One other situation in which it is desirable to provide a different calling number identification than is provided in the prior art, is a transfer wherein the originator causes a connection to be established between the called party and a third party. Caller 101 originally requests that a call be set up to station 122. After talking to the user of station 122, the caller at station 101 recognizes that the call should be transferred to a third party so that station 122 is connected, for example, to station 125, and station 101 is no longer connected to the call. In response to a request from station 101, switch 103 generates message 170 for transmission to switch 121. Message 170 includes the identity of the requesting number 171 and original called number 172, and called name 173, to identify the call. Message 170 also includes the identity 174 of the third party, and an indication 175 of the type of transfer requested. Message 163 will then be sent to terminal 125, including the identity of station 122 which, from the point of view of station 125, is the true "calling party".

Figure 2:
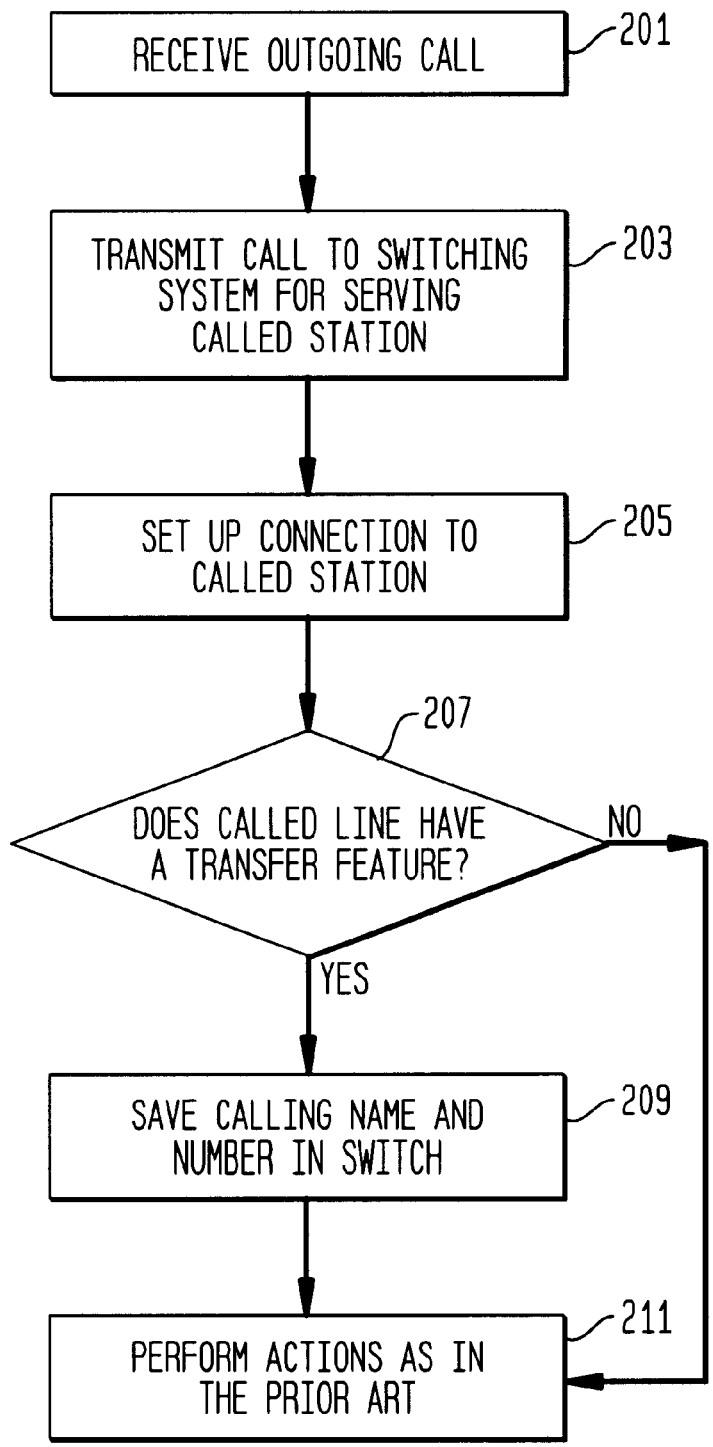
FIGS. 2–4 are flow diagrams illustrating the method of Applicants' invention.

FIG. 2 is a flow diagram illustrating the operation of Applicants' invention. The originating switch, (switch 103), receives an outgoing call, (Action Block 201). The originating switch transmits the call to a switching system for serving the called number, (Action Block 203). At the receiving end of this message, i.e., first terminating switch 121, a connection is established to the called station, (Action Block 205).

While the call is being established, Test 207 is performed to determine whether the called station has a transfer feature, aand whether the original calling party has permitted its number/name to be presented. If the called station does have a transfer feature and the calling party has permitted its number/name to be presented, then the original calling number and name are saved, (Action Block 209). Otherwise, the actions of the prior art are performed, (Action Block 211).

Figure 3:
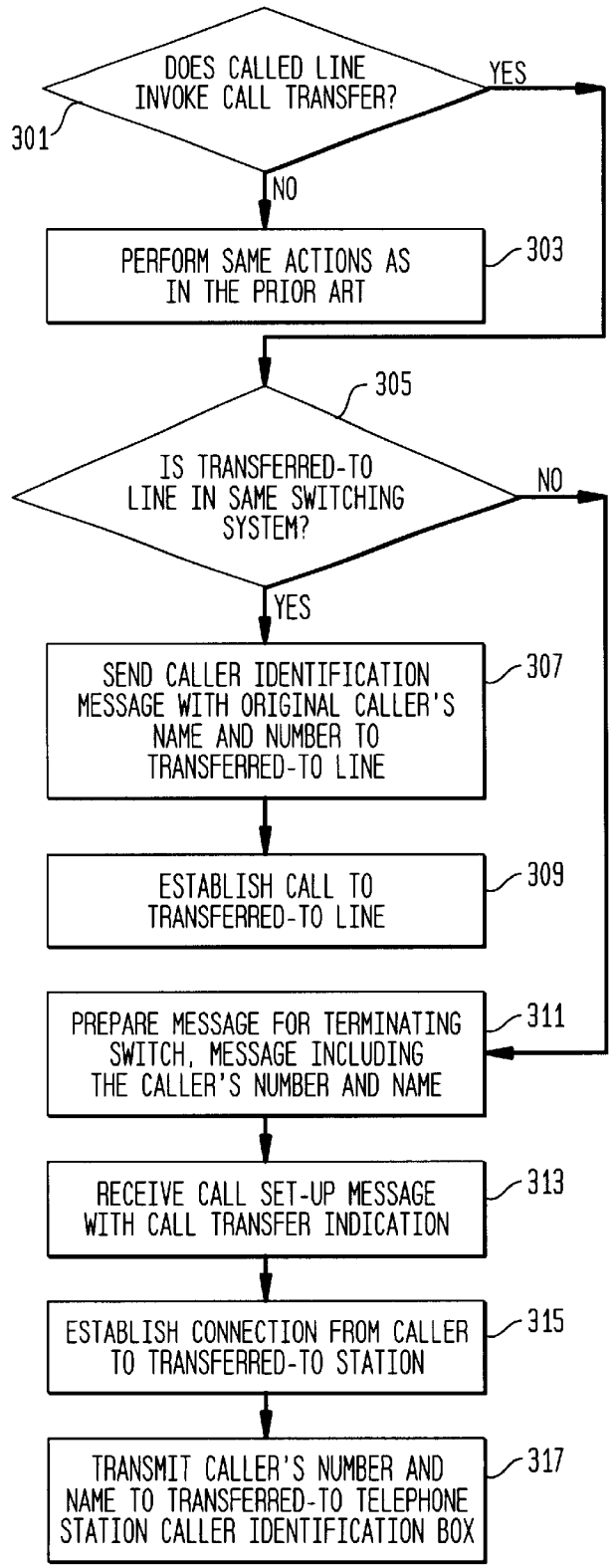

Test 301 (FIG. 3) determines whether the called party invokes call transfer. If not, then the actions of the prior art are performed, (Action Block 303). If the called station does invoke a call transfer feature, then Test 305 is used to determine whether the destination of the transferred call is in the same switching system. If the transferred-to station is in the same switching system, then the saved caller identification data is transmitted to the transferred-to station, (Action Block 307), and the call connection is established to the transferred-to station, (Action Block 309).

If the result of Test 305 indicates that the transferred-to terminal is not on the first terminating switch, then a message is prepared for the second terminating switch, the message including the caller's number and name, (Action Block 311). The call is received in the second intermediate switch with an indication that the call has been transferred, (Action Block 313). The transferred call is established, (Action Block 315), and the original caller's number and name is transmitted to the called station's caller identification box, (Action Block 317).

In an alternative embodiment, the transferring switch can request the original caller's identification data when a call transfer request is detected. This arrangement avoids the necessity for storing this data in the transferring switch, but may increase call set-up time.

Figure 4:
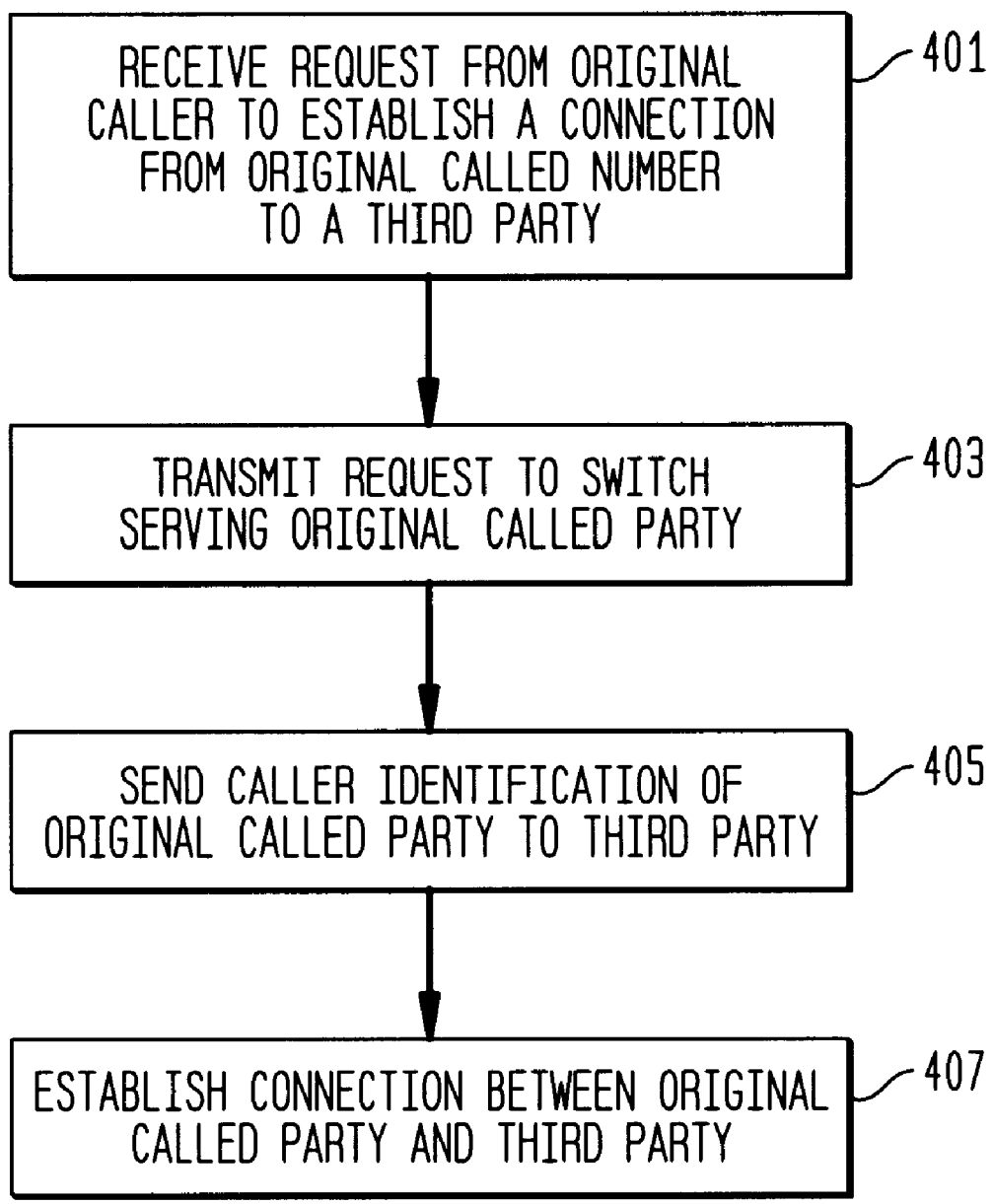

FIG. 4 illustrates the actions performed when a caller causes a connection to be established between a called party and a third party. The switch of the caller receives a request to establish such a connection, (Action Block 401). That switch then transmits a request to the switch serving the original called party, (Action Block 403). The switch serving the third party sends a caller identification message to the third party, the message specifying the identification of the original called party, (Action Block 405). A connection is established between the original called party and the third party, (Action Block 407), and the original caller is disconnected from the call.

The above description is of one preferred embodiment of Applicants' invention. Other embodiments will be apparent to those of ordinary skill in the art, without departing from the scope of this invention. The invention is limited only by the attached claims.

What is claimed is:

1. In a telecommunications network, a method for providing caller identification on a call comprising the steps of:

generating caller identification information for identifying an originating caller station in an originating switching system;

transmitting a call comprising said caller identification information to an initially selected terminating first switching system for serving a destination number provided by a caller of said call;

in said initially selected terminating switching system, transferring said call to a second switching system, different from said first system, serving a transferred-to number for calls transferred from said destination number provided by said caller of said call, without completing said call to said different transferred-to number provided by said caller of said call;

providing said caller identification information for identifying said originating caller station to said second switching system; and transmitting data, based on the provided caller identification information, to the transferred-to station.

2. The method of claim 1, wherein the step of providing, comprises the step of transmitting said caller identification information by means of a Common Channel Signaling Message.

3. The method of claim 1, wherein said caller identification information comprises a caller's telephone number.

4. The method of claim 1, wherein said caller identification information comprises a name associated with the caller's telephone number.

5. The method of claim 1, further comprising the step of storing said caller identification information in a switching system serving a telephone station having call transfer features when a call to that station is received.

6. Apparatus for providing caller identification information, comprising:

means for generating caller identification information for identifying an originating caller station in an originating switching system;

means for transmitting a call to an original destination number, comprising said caller identification information, to an initially selected first terminating switching system, said original destination number being for a telephone station which has requested call transfer service to a transferred-to telephone number served by a second switching system different from said first system;

means for receiving the originating caller station identification information of said call in said first switching system serving a transferring telephone station;

means for transmitting said call to said second switching system serving said transferred-to telephone station without completing said call to the transferring telephone station; and means for transmitting data representing said caller identification information to said second switching system for transmission to said transferred-to telephone station.

7. The apparatus of claim 6, wherein said means for transmitting data are connected to a Common Channel Signaling Network.

8. The apparatus of claim 6, further comprising:

means, responsive to receipt of said call, for storing said caller identification information in said switching system serving said transferring telephone station.

* * * * *